United States Patent [19]
Hase et al.

[11] Patent Number: 5,240,744
[45] Date of Patent: Aug. 31, 1993

[54] COATING PROCESS

[75] Inventors: Brigitte Hase, Erkrath; Ulrich Eicken, Duesseldorf; Wolfgang Gress, Wuppertal; Norbert Stork, Duesseldorf, all of Fed. Rep. of Germany

[73] Assignee: Henkel Kommanditgesellschaft auf Aktien, Duesseldorf, Fed. Rep. of Germany

[21] Appl. No.: 820,585

[22] PCT Filed: Jul. 12, 1990

[86] PCT No.: PCT/EP90/01143

§ 371 Date: Jan. 21, 1992

§ 102(e) Date: Jan. 21, 1992

[87] PCT Pub. No.: WO91/01354

PCT Pub. Date: Feb. 7, 1991

[30] Foreign Application Priority Data

Jul. 21, 1989 [DE] Fed. Rep. of Germany ....... 3924163

[51] Int. Cl.$^5$ .............................................. B05D 7/14
[52] U.S. Cl. .............................. 427/388.1; 427/389.7; 427/393; 427/393.5
[58] Field of Search .............................. 528/403, 423; 427/388.1

[56] References Cited

U.S. PATENT DOCUMENTS

| | | | |
|---|---|---|---|
| 3,373,194 | 3/1968 | Fuhrmann et al. | 528/403 |
| 4,365,056 | 12/1982 | Sunder-Plassman | 528/403 |
| 4,600,766 | 7/1986 | Arita et al. | 528/423 |

FOREIGN PATENT DOCUMENTS

| | | | |
|---|---|---|---|
| 048801 | 9/1980 | European Pat. Off. | 528/423 |
| 0273368 | 7/1988 | European Pat. Off. | |
| 0229926 | 4/1984 | Japan | 528/403 |
| 1164331 | 9/1969 | United Kingdom | 528/403 |

Primary Examiner—Shrive Beck
Assistant Examiner—Erma Cameron
Attorney, Agent, or Firm—Wayne C. Jaeschke; Norvell E. Wisdom, Jr.; Henry E. Millson, Jr.

[57] ABSTRACT

In the process described, cyclic polyimino ethers with $\Delta^2$-oxazoline or $\Delta^2$-5,6-dihydro-4H-1,3-oxazine structure are applied, alone or together with cyclic monoimino ethers of the same type, or with lactones, plus cationic polymerization catalysts, to solid surfaces and polymerized by heating. The process gives smooth, glossy coatings with high adhesive strength, hardness, and elasticity.

18 Claims, No Drawings

COATING PROCESS

BACKGROUND OF THE INVENTION

1. Field of the Invention

This invention relates generally to surface coating and, more particularly, to the low-solvent coating of solid surfaces.

2. Statement of Related Art

Solvent-containing lacquers and paints are mainly used in conventional processes for coating solid surfaces, especially metal and wood surfaces. In an effort to save organic solvents or to avoid them for ecological or safety reasons, water-based lacquers on the one hand and low-solvent and solventless coating systems on the other hand have recently been developed in addition to conventional lacquers and paints. In the field of low-solvent and solventless coating systems, a distinction is drawn between so-called powder lacquers and coatings applied in a liquid form. In powder lacquer technology, curable compounds or preformed thermoplastic polymers are applied to the surface in finely divided form, generally by electrostatic spraying, and are generally cured or melted to form a film by exposure to heat. The systems applied in liquid form are generally reactive compounds of relatively low molecular weight which polymerize on the surface and thus form a solid film.

For coating systems of this type applied in liquid form, only a few of the large number of polymerizable compounds have so far been successful. Polymerizable cyclic iminoethers have not hitherto been proposed as compounds for coating systems of this type. Solventless and low-solvent lacquers based on reactive epoxides, isocyanates, acrylates and melamine resins, some of which give very high-quality coatings, are of importance today. However, they are only used in narrow fields of application because not least their price and certain toxicological objections to some of the reactive components are obstacles to their use on a wide scale. A further explanation of the prior art can be found in the specialist literature, cf. for example *Ullmanns Encyklopädie der technischen Chemie*, 4th Edition, Vol. 15, Weinheim (1978), pages 590 et seq. and the original literture cited therein.

DESCRIPTION OF THE INVENTION

Summary of the Invention

For the reasons explained above, there is still a need to develop new and altogether more advantageous coating processes. The present invention addresses this problem.

The present invention relates to a process for coating solid surfaces in which a mixture of a) a cyclic polyiminoether having a $\Delta^2$-oxazoline or $\Delta^2$-5,6-dihydro-4H-1,3-oxazine structure, b) optionally at least one compound from the group of cyclic monoiminoethers having a $\Delta^2$-oxazoline or $\Delta^2$-5,6-dihydro-4H-1,3-oxazine structure or from the group of lactones containing 4, 5, 6 or 7 ring members, c) a cationic polymerization catalyst and d) optionally auxiliaries and additives typically encountered in coatings is applied to the surfaces and is polymerized on the surface by heating.

The process according to the invention is suitable for surfaces of various materials, including metal, wood, glass and plastics, providing they are capable of withstanding the temperatures required for curing. It leads to compact, smooth coatings which are distinguished by high adhesive strength, hardness and elasticity and by high gloss. Another advantage over known systems is that the final polymerizable mixture can be stored for very long periods at room temperature.

DESCRIPTION OF PREFERRED EMBODIMENTS

The individual components of the mixture to be applied to the surface are described in more detail in the following. Where reference is made to earlier publications, their respective disclosures are specifically included in the subject matter of the present application.

Component a

Suitable cyclic polyiminoethers are compounds which contain the group

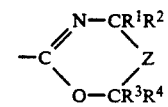

two or more times in their molecule. In formula I, Z is either a direct bond or the group $CR^5R^6$ and the substituents $R^1$ to $R^6$ independently of one another represent H, alkyl or aryl containing up to 8 carbon atoms. Polyiminoethers in which at least 4 of the substituents $R^1$ to $R^6$ are hydrogen atoms and the others consist of $C_{1-3}$ alkyl are preferred. Compounds in which I is a 2-$\Delta^2$-oxazoline group, i.e. Z is a direct bond, are also preferred. Of these compounds, those having the following substitution patterns are particularly preferred:

$R^1 = CH_3$, $R^2 - R^4 = H$ $R^3 = CH_3$, $C_2H_5$ or phenyl; $R^1$, $R^2$ and $R^4 = H$ Polyiminoethers in which all the substituents $R^1$ to $R^6$ are hydrogen atoms are most particularly preferred.

The cyclic polyiminoethers used preferably contain the group I two, three or four times and are also referred to as bis-, tris- and tetrakis-oxazolines or bis-, tris- and tetrakis-(5,6-dihydro-4H-1,3-oxazines). Bisiminoethers are particularly preferred.

Cyclic polyiminoethers suitable for the purposes of the invention are known per se. They are normally prepared from di- or polycarboxylic acids or derivatives thereof and correspondingly substituted alkanolamines or equivalent reactants by cyclizing condensation similarly to the preparation of cyclic monoiminoethers from monocarboxylic acids and derivatives thereof. Examples of suitable polyiminoethers and their preparation can be found in DE 2 029 524, DE-OS 2 158 615, DE-OS 3 047 759 and EP-A 273 368. Typical representatives are tetramethylene bisoxazoline; p-phenylene bisoxazoline and 1,4-cyclohexylene bis-(5,6-dihydro-4H-1,3-oxazine).

Another method of preparing cyclic polyiminoethers starts out from cyclic monoiminoethers which contain the group I only once and which bear a reactive group at the substituent in the 2 position. Monoiminoethers such as these are also known per se and can be obtained by conventional methods, generally from monocarboxylic acids or derivatives thereof (see, for example, A. Levy and M. Litt, *J. Polym. Sci.* A1, 6 1883 (1968); S. Kobayashi and T. Saegusa in *Ring-Opening Polymerization*, Vol. 2, Ed. K. J. Irvin, T. Saegusa, London 1984, page 761; and also EP 88118090.5 and EP 90107481.5). These monoiminoethers are attached to polyfunctional reagents by the reactive group, the polyiminoethers (a) suitable for the purposes of the invention being formed with the iminoether group (I) intact. Thus, 2-alkenyl oxazolines or 2-alkenyl oxazines may be attached to polymercaptans, for example in accordance with U.S. Pat. No. 4,593,103, or hydroxyl-functional oxazolines or oxazines may be attached to polyisocyanates to form polyiminoethers in accordance with PCT/EP90/00733. Di- and poly-iminoethers according to PCT/EP90/00733 are particularly preferred for the process according to the invention; they may still contain small quantities of free or masked polyisocyanate, depending on the process used for their production. In principle, these polyiminoethers could also be formed during the coating process from hydroxyl-functional monoiminoethers and the necessary quantities of polyisocyanate, although this would involve handling of the toxicologically unsafe polyisocyanates which can avoided in the manner described above.

Component b

In addition to the polyiminoethers (a), the mixtures used in accordance with the invention may contain compounds from the group of cyclic monoiminoethers, from the group of lactones or mixtures of both. Suitable monoiminoethers are $\Delta^2$-oxazolines and $\Delta^2$-oxazines substituted in the 2-position which, more precisely, are also referred to as 5,6-dihydro-4H-1,3-oxazines. They correspond to formula II:

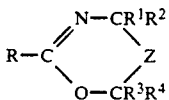

in which Z is a direct bond or represents the group $CR^5R^6$ and $R^1$ to $R^6$ are as defined for formula I; in the polyiminoethers (a) and the monoiminoethers (b), Z and $R^1$ to $R^6$ may of course be independently selected within the scope of the definition. R is a $C_{1-21}$ and preferably $C_{6-17}$ aliphatic, aromatic or araliphatic radical attached via carbon which may optionally contain ether groups and may bear further substituents which do not affect the polymerization reaction.

Monoiminoethers in which at least four of the substituents $R^1$ to $R^6$ are hydrogen atoms and the others consist of $C_{1-3}$ alkyl are preferred. The compounds in which Z is a direct bond are also preferred. Of these compounds, those having the following substitution patterns are particularly preferred:

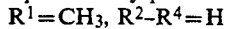
$R^1=CH_3$, $R^2-R^4=H$
$R^3=CH_3$, $CH_2H_5$ or phenyl; $R^1$, $R^2$ and $R^4=H$

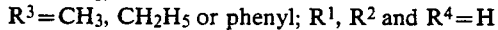

Monoiminoethers in which all the substituents $R^1$ to $R^6$ are hydrogen are most particularly preferred. The monoiminoethers of formula II suitable for the purposes of the invention are known per se and may be obtained by standard methods, mainly from monocarboxylic acids or derivatives thereof and corresponding alkanolamines or equivalent compounds by cyclizing condensation. Relevant particulars can be found in the literature cited under a) for monoiminoethers.

In addition to aromatically substituted iminoethers, such as 2-phenyl oxazoline, particular preference is attributed above all to the iminoethers obtainable from fatty acids in which R is a long-chain aliphatic radical containing 7 to 17 carbon atoms.

In addition to monoiminoethers, lactones having a 4-membered, 5-membered, 6-membered or 7-membered ring are suitable as component b. The unsubstituted compounds butyrolactone, valerolactone and caprolactone are particularly preferred, although these lactones may also be substituted, preferably by $C_{1-3}$ alkyl groups.

Ratio of a to b

The molar ratio of components a and b and the valency of component a largely determine the curing rate in the polymerization reaction and also the mechanical properties of the coating produced. Accordingly, components a and b are preferably in an equivalent ratio of 95:5 to 5:95 and, more particularly, 80:20 to 20:80, the equivalent weight being understood here to be the molecular weight divided by the number of iminoether groups present in the molecule (valency).

Component c

Suitable catalysts for the polymerization of components a and b are, generally, any catalysts which are capable of initiating a cationic polymerization and which are also known for the polymerization of cyclic iminoethers, for example from DE 12 06 585. The catalysts in question are generally Lewis acids or Brönsted acids or alkylating agents which are capable of forming salt-like compounds with the iminoethers and also the salt-like compounds themselves. Examples are trifluoromethanesulfonic acid methyl ester, o- and p-toluenesulfonic acid and N-methyl-2-phenyl oxazolinium trifluoromethanesulfonate. Since the cationic polymerization of cyclic iminoethers is a so-called living polymerization which, in principle, can always be continued at the chain ends by addition of other monomers, "living" polymers which may be prepared from component b alone are also suitable as catalysts for the process according to the invention.

Liquid catalysts and catalysts which readily dissolve in the mixture of a and b at room temperature are preferred for the purposes of the present invention. In selecting the catalysts, it is important to ensure that they are compatible with the coating substrate during and after polymerization.

The quantity of catalyst critically determines the polymerization rate, so that the curing conditions for the mixture as a whole (time, temperature) can largely be determined in advance through the choice of the quantity used. A quantity of $5\times10^{-2}$ to $10^{-5}$ moles of catalyst per equivalent of components a+b is normally sufficient. Quantities above or below these limits may of course also be used.

Component d

According to the invention, coatings of excellent quality can be obtained from components a and c alone or from components a, b and c alone, individual properties of the coatings, particularly their elasticity, also being variable within wide limits through the choice of the individual components and the quantities in which they are used. In addition, the properties of the mixture to be processed and of the final coating can also be varied by incorporation of further additives. In principle, suitable further additives are any of the auxiliaries and fillers typically used for conventional paints and lacquers, including for example dyes, pigments, thickeners, light stabilizers, solvents, plasticizers, resins and other binders.

The properties of the coatings can be adapted even more closely to the requirements of the substrate and the particular protective function intended through the use of resins and other binders of the type typically used in lacquer technology. Examples of such resins and binders are polyacrylate, polyester, chlorinated rubber, alkyd resin, polyurethane and polymeric iminoether (linear polymer of monoiminoethers corresponding to formula II). The quantity of resins and binders added is determined by the desired effect and may be freely selected within wide limits.

Thickeners and solvents are primarily used to adjust the rheological properties of the mixture to be used where it is liquid. Suitable organic solvents are, above all, aromatic hydrocarbons and chlorinated hydrocarbons. Solvents which evaporate below the curing temperature are preferred. Their percentage content in the mixture as a whole is normally not more than 50% by weight and is preferably between 1 and 20% by weight, although the total absence of organic solvents is particularly preferred. Suitable thickeners are both low molecular weight substances, such as for example modified hydrogenated fats, and also polymeric compounds, for example polyesters.

The color and transparency of the coatings can be varied as required by the addition of dyes, pigments and fillers. Whereas the polymers of a or a and b alone give transparent and substantially colorless surface coatings, lacquers of high covering power or transparent varnishes can be obtained with additions such as these. The quantity in which they are used is again determined by the desired effect.

In choosing the auxiliaries and additives, it is of course important to ensure that they do not affect the polymerization of components a and b. For example, substances having a base-like effect will generally not be used.

The quantity of auxiliaries and additives in the mixture to be polymerized may be extremely high without affecting the advantages of the process according to the invention. However, the total content of component d is not more than 70% by weight and, in particular, is not more than 50% by weight, based on the total mixture of components a, b, c and d. The lower limit is determined by the desired effect and, for example in the case of dyes, may be at 0.001% by weight or lower.

To carry out the process according to the invention, an intimate mixture is initially prepared from components a and c, and, optionally, b and/or d. The components may be added in any order. In general, the mixture remains stable for several days to several weeks at room temperature, so that the components do not have to be mixed immediately before use. This is of advantage above all when several small-scale coating processes have to be carried out discontinuously. However, it is of course also possible to mix all the components or individual components, particularly the catalyst c, only shortly before use. The late addition of the catalyst can be of advantage if the virtually indefinite storability of the mixture of a, b and optionally d is to be utilized. Finally, mixing of the components on the surface to be coated, which also leads to the process according to the invention, may be regarded as the extreme case.

If curing of the same components is not carried out on a surface to be coated, resins are obtained in many cases and may be used with advantage for other applications, for example as raw materials, adhesives or support materials. However, this is not the subject of the present invention.

Mixtures which are liquid at room temperature or at slightly elevated temperature, so that they may be applied to the surface by any of the techniques normally used for liquid lacquers, for example by spread coating, spray coating or dip coating, are preferably used in accordance with the invention. However, it is also possible to apply mixtures of solid components to the surface by any of the methods typically used in powder lacquer technology, for example by electrostatic spraying. In either case, application of components a to d to the surfaces is followed by a heat treatment because curing of the mixture at room temperature generally takes too long for practical application. The necessary temperatures and curing times may be varied within wide limits, above all through the quantity of component c, but are also determined by the reactivity and concentration of components a and b. Temperatures in the range from about 80° to about 250° C. and polymerization times in the range from about 5 to about 120 minutes may be taken as guides. The choice of the temperature and therewith the time is of course also governed by the sensitivity of the substrate and the other constituents of the coating. It may be advisable in some cases to carry out the heat treatment in an inert gas atmosphere. The mixture may be heated by various methods, for example with warm air, by radiation, such as infrared or microwave radiation, or by contact heating of the surface to be coated from the rear. In practice, therefore, the choice of a suitable heating process can be entirely determined by external parameters of the process, for example by whether the process is carried out continuously or discontinuously.

EXAMPLES

In the following Examples, mixtures of components a and c and optionally b and d were prepared and applied by coating knife to plates of various materials. After heat treatment in a recirculating air drying cabinet, the properties of the films obtained are tested by the methods typically used in paint technology.

The following starting materials were used:

Component a

The polyiminoethers a1 to a9 used were prepared from equivalent quantities of commercially available polyisocyanates and hydroxyl-functional monoiminoethers in accordance with earlier patent application PCT/EP90/00733. The monoiminoethers in turn had been prepared from hydroxycarboxylic acids or esters thereof and ethanolamine or 3-aminopropan-1-ol in accordance with earlier patent applications EP 88118090.5 and EP 90107481.5. Tetramethylene bisoxazoline (a 15) was obtained in accordance with DOS 2 158 615; m-phenylene bisoxazoline was commercially obtainable (Showa Denko, Tokyo).

Table 1 contains further particulars of the individual compounds. Except for a3, the compounds are bisiminoethers (a3 is a triiminoether) which are all unsubstituted (formula I, $R_1$–$R_6$=H). Except for a7 (Z=$CH_2$ in formula I), they are polyoxazolines (Z=direct bond).

Component b

Both commercially available lactones (b16–b19) and monoiminoethers corresponding to formula II ($R_1$–$R_6$=H) were used as component b). Where the monoiminoethers were not commercially available (b10), they were prepared from carboxylic acids or esters thereof and ethanolamine or 3-aminopropan-1-ol in accordance with earlier patent applications EP 88118090.5 and EP 90107481.5 Further particulars of the individual compounds can be found in Table 2.

Component c

The following compounds were used as catalysts in the tests described herein:

c1 trifluoromethanesulfonic acid methyl ester
c2 p-toluenesulfonic acid methyl ester
c3 toluenesulfonic acid methyl ester (o-/p-mixture, technical, BASF)
c4 $BF_3$ etherate d1 Polyester (Grilesta® P 7205, EMS Chemie)
d2 Polyester (Grilesta® V 73-9, EMS Chemie)
d3 Rilanit® HT (modified, hydrogenated fatty acid, Henkel)
d4–d12 Copolymers of monooxazolines corresponding to formula II prepared by cationic polymerization in accordance with the particulars of Example A of PCT/EP90/00019. For particulars, see Table 3. The molecular weights shown are weight average molecular weights determined by gel chromatography against polystyrene as standard.

TABLE 1

| No. | Equivalent weight | Monoiminoether based on | Z | Polyisocyanate |
|---|---|---|---|---|
| a1 | 448 | Ricinoleic acid | — | MDI (4,4'-diphenylmethane diisocyanate) |
| a2 | 434 | Ricinoleic acid | — | Isophorone diisocyanate |
| a3 | 482 | Ricinoleic acid | — | Desmodur® (N,N',N''-tris-{ω-isocyanato-hexyl}-biuret) |
| a4 | 412 | 12-Hydroxystearic acid | — | TDI (2,4-toluylenediisocyanate) |
| a5 | 282 | 6-Hydroxycaproic acid | — | MDI |
| a6 | 536 | Epoxidized erucic ring-opened with methanol | — | MDI |
| a7 | 462 | Ricinoleic acid | $CH_2$ | MDI |
| a8 | 407 | Ricinoleic acid | — | 1,6-Hexamethylenediisocyanate |
| a9 | 454 | Ricinoleic acid | — | Desmodur® W (4,4'-dicyclohexyl methane diisocyanate) |
| a10 | 268 | 6-Hydroxycaproic (caprolactone) | — | Isophorone diisocyanate |
| a11 | 445 | Ricinoleic acid | — | Tetramethyl xylene diisocyanate (TMXDI®) |
| a12 | 436 | 12-Hydroxystearic acid | — | Isophorone diisocyanate |
| a13 | 456 | 12-Hydroxystearic | — | Desmodur® W |
| a14 | 279 | 6-Hydroxycaproic acid | — | TMXDI® |
| a15 | 98 | Tetramethyl bisoxazoline | | |
| a16 | 118 | m-Phenylene bisoxazoline | | |

TABLE 2

| No. | Equivalent weight | Carboxylic acid base of the monoiminoether | Z | Formula II R |
|---|---|---|---|---|
| b1 | 309 | Stearic acid | — | $C_{17}H_{35}$ |
| b2 | 309 | Isosteary acid | — | $C_{17}H_{35}$ |
| b3 | 300 | Soybean oil fatty acid* | — | Mixture |
| b4 | 306 | Conjuene fatty acid** | — | Mixture |
| b5 | 323 | Ricinoleic acid | — | $C_{17}H_{32}OH$ |
| b6 | 225 | Lauric acid | — | $C_{11}H_{23}$ |
| b7 | 197 | Capric acid | — | $C_9H_{19}$ |
| b8 | 169 | Caprylic acid | — | $C_7H_{15}$ |
| b9 | 151 | Head-fractionated fatty acid ($C_{6-12}$)*** | — | Mixture |
| b10 | 99 | Propionic acid | — | $C_2H_5$ |
| b11 | 147 | Benzoic acid | — | $C_6H_5$ |
| b12 | 314 | Soybean oil fatty acid* | $CH_2$ | Mixture |
| b13 | 239 | Lauric acid | $CH_2$ | $C_{11}H_{23}$ |
| b14 | 161 | Benzoic acid | $CH_2$ | $C_6H_5$ |
| b15 | 183 | 2-Ethyl hexanoic acid | $CH_2$ | $C_7H_{15}$ |
| b16 | 114 | ε-caprolactone | | |
| b17 | 86 | γ-butyrolactone | | |
| b18 | 100 | γ-valerolactone | | |
| b19 | 100 | δ-valerolactone | | |

*Fatty acid mixture of soybean oil (average C chain length of the carboxylic acid: $C_{18}$)
**Edenor® UKD 6010 (Henkel): fatty acid mixture containing conjugated double bonds obtained by alkali isomerization (average C chain length: C18)
***Edenor® V 85 KR (Henkel)

Component d

In individual tests, the mixtures to be polymerized contain additives in the form of thickeners and/or binders:

TABLE 3

Polyoxazolines as additives

| No. | Starting monomer: Oxazolines based on | Molar ratio in polymer | Molecular weight/$10^3$ |
|---|---|---|---|
| d4 | (Soybean oil fatty acid/ricinoleic acid)/propionic acid | 2:1:5 | 20** |
| d5 | Lauric acid/propionic acid | 1:10 | 11** |
| d6 | Lauric acid/propionic acid | 1:10 | 11* |
| d7 | Lauric acid/propionic acid | 1:5 | 12* |
| d8 | Stearic acid/benzoic acid | 3:2 | 25* |
| d9 | Stearic acid/propionic acid | 1:10 | 12** |
| d10 | Soybean oil fatty acid/benzoic acid | 3:2 | 24* |
| d11 | Capric acid/propionic acid | 1:10 | 11** |
| d12 | Soybean oil fatty acid/propionic acid | 3:2 | 22* |

*Prepared in accordance with PCT/EP90/00019, method IV
**Prepared in accordance with PCT/EP90/00019, method II
(in either case with 1 mol-% methyl tosylate, based on oxazoline)

PROCESS EXAMPLES

Table 4 shows the composition of the mixtures used for coating and sets out the polymerization conditions. In the composition of the mixtures, the concentration of c is expressed in equivalent-%, based on a+b, while the concentration of d is expressed in % by weight, based on b. A recirculating air drying cabinet was used for curing.

TEST RESULTS

The coatings of Examples 1 to 78 were tested for their mechanical properties and for their adhesive strength on steel plates, aluminium plates and, in some cases, on glass. In every case, the layer thickness was 30 to 35 μm. Pendulum hardness was tested in accordance with DIN 53 157, impact indentation (reverse) in accordance with US standard ASTM-D 2795-69 and crosshatch adhesive strength in accordance with H. J. Peters (in Zeidler-Bleisch, *Laboratoriumsbuch für die Lack- und Anstrichmittelindustrie*, pages 309–310, W. Knopp Verlag, Düsseldorf 1967), all the tests being carried out at room temperature. The results are shown in Tables 5 (iron plates) and 6 (aluminium plates and glass). Relatively high pendulum hardness and impact indentation figures respectively correspond to greater hardness and better flexibility of the coating. Crosshatch adhesion is visually evaluated on a scale of 0 (best adhesion) to 4 (poor adhesion). The excellent adhesion, even of particularly hard films, is particularly worth noting.

TABLE 4

| | Process Conditions | | | | | | | |
|---|---|---|---|---|---|---|---|---|
| | Composition of the mixture | | | Component c | | Component d | | Polymerization conditions |
| Example | Component a | Component b (molar ratio) | a:b (equivalent ratio) | Type | Concentration equ.-% | Type | Concentration % by wt. | t/min. | T/°C. |
| 1 | a1 | b6 | 3:7 | c1 | 2 | d5 | 30 | 25 | 160 |
| 2 | a1 | b8 | 3:7 | c1 | 1 | d5 | 30 | 15 | 160 |
| 3 | a1 | b11 | 3:7 | c2 | 1 | d6 | 30 | 15 | 160 |
| 4 | a1 | b6/b11 (1:1) | 3:7 | c2 | 1 | d5 | 30 | 25 | 160 |
| 5 | a5 | b6 | 3:7 | c1 | 1 | — | — | 30 | 160 |
| 6 | a1 | b6 | 3:7 | c2 | 1 | d3 | 3 | 30 | 160 |
| 7 | a1 | b6 | 3:7 | c2 | 1 | d7 | 30 | 30 | 160 |
| 8 | a1 | b6/b11 (1:1) | 3:7 | c3 | 1 | d5/d6 | 15 + 15 | 25 | 160 |
| 9 | a1 | b6 | 3:7 | c2 | 1 | d2 | 10 | 25 | 160 |
| 10 | a1 | b6 | 3:7 | c2 | 1 | d1 | 10 | 25 | 160 |
| 11 | a1 | b9 | 3:7 | c1 | 1 | — | — | 30 | 140 |
| 12 | a1 | b8 | 3:7 | c1 | 1 | d7 | 30 | 15 | 160 |
| 13 | a1 | b8 | 3:7 | c3 | 1 | d9 | 30 | 30 | 140 |
| 14 | a1 | b8 | 3:7 | c1 | 2 | d12 | 30 | 30 | 140 |
| 15 | a1 | b8 | 3:7 | c3 | 1 | d8 | 30 | 20 | 160 |
| 16 | a6 | b8 | 3:7 | c2 | 1 | — | — | 20 | 160 |
| 17 | a1 | b9/b2 (7:1) | 3:7 | c1 | 1 | d6 | 30 | 20 | 160 |
| 18 | a15 | b1 | 1:9 | c2 | 1 | — | — | 30 | 160 |
| 19 | a1 | b8 | 4:6 | c1 | 1 | d5 | 30 | 30 | 140 |
| 20 | a1 | b11/b6 (1:1) | 3:7 | c1 | 1 | d5/d6 | 15 + 15 | 20 | 160 |
| 21 | a1 | b11 | 2:8 | c3 | 1 | d6 | — | 15 | 160 |
| 22 | a1 | b11 | 3:7 | c3 | 1 | d11 | 30 | 45 | 120 |
| 23 | a1 | b16 | 3:7 | c2 | 1 | — | — | 30 | 160 |
| 24 | a1 | b11 | 3:7 | c1 | 1 | d9 | 30 | 30 | 140 |
| 25 | a4 | b7 | 3:7 | c2 | 1 | — | — | 30 | 160 |
| 26 | a1 | b11 | 3:7 | c3 | 1 | d12 | 30 | 30 | 160 |
| 27 | a1 | b6 | 3:7 | c1 | 1 | d10 | 10 | 30 | 160 |
| 28 | a6 | b6 | 3:7 | c2 | 1 | — | — | 30 | 160 |
| 29 | a1 | b11 | 3:7 | c1 | 1 | d4 | 10 | 30 | 140 |
| 30 | a1 | b17 | 3:7 | c1 | 1 | — | — | 30 | 160 |
| 31 | a1 | b8/b16 (4:3) | 3:7 | c2 | 1 | — | — | 20 | 160 |
| 32 | a1 | b8 | 3:7 | c2 | 1 | — | — | 30 | 140 |
| 33 | a3 | b7 | 3:7 | c2 | 1 | — | — | 30 | 160 |
| 34 | a1 | b10 | 1:9 | c3 | 1 | — | — | 20 | 160 |
| 35 | a1 | b8 | 2:8 | c1 | 1 | d5 | 30 | 30 | 140 |
| 36 | a7 | b7/b4 (7:1) | 2:8 | c2 | 1 | — | — | 20 | 160 |
| 37 | a1 | b11 | 4:6 | c1 | 1 | d6 | 30 | 45 | 120 |
| 38 | a2* | b7 | 3:7 | c2 | 1 | — | — | 15 | 160 |
| 39 | a8* | b16 | 3:7 | c2 | 1 | — | — | 30 | 160 |
| 40 | a1 | b7/b12 (9:1) | 3:7 | c1 | 2 | — | — | 30 | 160 |
| 41 | a2* | b6/b8 (1:1) | 4:6 | c2 | 1 | — | — | 30 | 160 |
| 42 | a4 | b13/b17 (2:1) | 3:7 | c3 | 1 | — | — | 30 | 160 |
| 43 | a1 | b13 | 3:7 | c2 | 1 | — | — | 30 | 160 |
| 44 | a1 | b6/b16 (4:3) | 3:7 | c1 | 1 | — | — | 30 | 160 |
| 45 | a1 | — | 1:0 | c1 | 1 | — | — | 30 | 160 |
| 46 | a1 | b6/b14 (9:1) | 4:6 | c2 | 2 | — | — | 30 | 160 |
| 47 | a4 | b11/b15 (9:1) | 3:7 | c2 | 2 | — | — | 30 | 160 |
| 48 | a1 | b11 | 3:7 | c1 | 1 | — | — | 30 | 140 |
| 49 | a1 | b19 | 3:7 | c2 | 1 | — | — | 25 | 160 |
| 50 | a1 | b7/b13/b16 (1:1:1) | 3:7 | c2 | 1 | — | — | 30 | 160 |
| 51 | a1 | b18 | 3:7 | c3 | 1 | — | — | 30 | 160 |
| 52 | a4 | — | 1:0 | c1 | 1 | — | — | 30 | 160 |
| 53 | a1 | b6 | 8:2 | c3 | 1 | — | — | 25 | 160 |
| 54 | a1 | b6 | 9:1 | c3 | 1 | — | — | 25 | 160 |
| 55 | a4 | b7/b4 (9:1) | 4:6 | c3 | 1 | — | — | 30 | 160 |
| 56 | a1 | b9/b1 (5:1) | 3:7 | c1 | 1 | — | — | 25 | 160 |
| 57 | a6 | — | 1:0 | c2 | 1 | — | — | 30 | 160 |
| 58 | a1 | b11/b3 (4:1) | 3:7 | c3 | 1 | — | — | 25 | 160 |
| 59 | a1 | b11 | 9:1 | c2 | 1 | — | — | 30 | 140 |
| 60 | a2 | b6/b5 (9:1) | 3:7 | c1 | 1 | — | — | 30 | 160 |
| 61 | a1/a4 (1:1) | b11 | 3:7 | c3 | 1 | — | — | 20 | 140 |
| 62 | a1 | b6 | 3:7 | c1 | 1 | — | — | 30 | 160 |

TABLE 4-continued

| | | | Process Conditions | | | | | | |
|---|---|---|---|---|---|---|---|---|---|
| | | | Composition of the mixture | | | | | | |
| | | | | | Component c | | Component d | | |
| | | Component | a:b | | Concentration | | Concentration | Polymerization conditions | |
| Example | Component a | b (molar ratio) | (equivalent ratio) | Type | equ.-% | Type | % by wt. | t/min. | T/°C. |
| 63 | a2* | b6 | 3:7 | c3 | 2 | — | — | 25 | 160 |
| 64 | a7 | b6 | 3:7 | c1 | 1 | — | — | 30 | 160 |
| 65 | a9 | — | 1:0 | c1 | 1 | — | — | 30 | 160 |
| 66 | a5 | b11 | 3:7 | c3 | 2 | — | — | 45 | 120 |
| 67 | a6 | b11 | 3:7 | c2 | 1 | — | — | 30 | 140 |
| 68 | a15 | b6 | 3:7 | c1 | 1 | — | — | 30 | 160 |
| 69 | a3 | b6 | 3:7 | c1 | 1 | — | — | 30 | 160 |
| 70 | a4 | b11 | 3:7 | c3 | 1 | — | — | 10 | 180 |
| 71 | a16 | b7 | 3:7 | c2 | 1 | — | — | 30 | 160 |
| 72 | a2 | b7 | 3:7 | c4 | 1 | — | — | 30 | 160 |
| 73 | a13 | — | 1:0 | c3 | 1 | — | — | 30 | 160 |
| 74 | a12 | — | 1:0 | c3 | 1 | — | — | 30 | 160 |
| 75 | a10 | b7 | 3:7 | c3 | 1 | — | — | 30 | 160 |
| 76 | a16 | b11 | 2:8 | c2 | 1 | — | — | 30 | 160 |
| 77 | a14 | b7 | 3:7 | c4 | 1 | — | — | 30 | 160 |
| 78 | a11 | b7 | 3:7 | c3 | 1 | — | — | 30 | 160 |

*Containing about 5% diisocyanate from production

TABLE 5

Coatings on steel plates

| Example | Pendulum hardness s | Impact indentation inch × pound | Crosshatch adhesion |
|---|---|---|---|
| 1 | 183 | >80 | 0 |
| 2 | 198 | >80 | 0 |
| 3 | 200 | >80 | 0 |
| 4 | 165 | >80 | 0 |
| 5 | 200 | 10 | 4 |
| 6 | 130 | >80 | 0 |
| 7 | 155 | >80 | 0 |
| 8 | 179 | >80 | 0 |
| 9 | 113 | >80 | 0 |
| 10 | 150 | >80 | 0 |
| 11 | 170 | >80 | 0 |
| 12 | 186 | >80 | 0 |
| 13 | 196 | 60 | 0 |
| 14 | 153 | >80 | 0 |
| 15 | 175 | 60 | 0 |
| 16 | 167 | >80 | 0 |
| 17 | 150 | >80 | 0 |
| 18 | 154 | 20 | 4 |
| 19 | 192 | >80 | 0 |
| 20 | 179 | >80 | 0 |
| 21 | 186 | >80 | 0 |
| 22 | 193 | >80 | 0 |
| 23 | 188 | >80 | 0 |
| 24 | 200 | 60 | 0 |
| 25 | 188 | >80 | 0 |
| 26 | 167 | >80 | 0 |
| 27 | 120 | >80 | 0 |
| 28 | 120 | >80 | 0 |
| 29 | 155 | >80 | 0 |
| 30 | 183 | 40 | 0 |
| 31 | 193 | >80 | 0 |
| 32 | 185 | >80 | 0 |
| 33 | 93 | >80 | 0 |
| 34 | 136 | >80 | 0 |
| 35 | 195 | >80 | 0 |
| 36 | 22 | >80 | 0 |
| 37 | 193 | >80 | 0 |
| 38 | 150 | >80 | 0 |
| 39 | 172 | >80 | 0 |
| 40 | 169 | >80 | 0 |
| 41 | 110 | >80 | 0 |
| 42 | 150 | >80 | 0 |
| 43 | 168 | >80 | 0 |
| 44 | 175 | >80 | 0 |
| 45 | 168 | >80 | 0 |
| 46 | 140 | >80 | 0 |
| 47 | 155 | >80 | 0 |
| 48 | 174 | >80 | 0 |
| 49 | 176 | >80 | 0 |
| 50 | 173 | >80 | 0 |
| 51 | 183 | >80 | 0 |
| 52 | 79 | >80 | 1 |
| 53 | 187 | >80 | 0 |
| 54 | 183 | >80 | 0 |
| 55 | 141 | >80 | 0 |
| 56 | 97 | >80 | 0 |
| 57 | 140 | 20 | 0 |
| 58 | 40 | >80 | 0 |
| 59 | 179 | >80 | 0 |
| 60 | 21 | >80 | 0 |
| 61 | 195 | >80 | 0 |
| 71 | 182 | <20 | 0 |
| 72 | 84 | >80 | 0 |
| 73 | 134 | >80 | 0 |
| 74 | 109 | >80 | 0 |
| 75 | 204 | >80 | 0 |
| 76 | 221 | <20 | 1 |
| 77 | 218 | 20 | 0 |
| 78 | 85 | >80 | 0 |

TABLE 6

Coatings on aluminium and glass

| Example | Substrate | Pendulum hardness/s | Crosshatch adhesion |
|---|---|---|---|
| 5 | Aluminium plate | 154 | 1 |
| 22 | Aluminium plate | 169 | 0 |
| 28 | Aluminium plate | 168 | 0 |
| 45 | Aluminium plate | 172 | 0 |
| 63 | Aluminium plate | 185 | 0 |
| 64 | Aluminium plate | 188 | 0 |
| 65 | Aluminium plate | 137 | 0 |
| 66 | Aluminium plate | 200 | 3 |
| 67 | Aluminium plate | 162 | 0 |
| 68 | Aluminium plate | 172 | 0 |
| 69 | Aluminium plate | 126 | 0 |
| 70 | Aluminium plate | 175 | 0 |
| 22 | Glass plate | 182 | 0 |
| 62 | Glass plate | 99 | 0 |

What is claimed is:

1. A process for coating a solid surface, in which a mixture of a) a cyclic polyiminoether having at least two Δ²-oxazoline structures therein, b) optionally at least one compound selected from the group consisting of cyclic monoiminoethers having a Δ²-oxazoline structure, cyclic monoiminoethers having a Δ²-5,6-dihydro-4H-1,3-oxazine structure, and lactones containing 4, 5, 6 or 7 ring members, c) a cationic polymerization catalyst and d) optionally, auxiliaries and additives for coatings is applied to the surface and is polymerized on the surface by being heated; and wherein when component b) is present in the mixture the equivalent ratio of components a) and b) is from about 95:5 to about 5:95.

2. A process as claimed in claim 1, in which components a and b are both present.

3. A process as claimed in claim 2, in which component a is a bisiminoether.

4. A process as claimed in claim 2, in which component a is an iminoether obtainable from reacting a polyisocyanate and a hydroxyl-functional cyclic monoiminoether.

5. A process as claimed in claim 2, in which component b contains an oxazine or oxazoline that is substituted in the 2-position with a phenyl group or an alkyl group that has from 7 to 17 carbon atoms.

6. A process as claimed in claim 2, in which an ester of trifluoromethanesulfonic acid or of a toluene sulfonic acid is used as the catalyst (c).

7. A process as claimed in claim 2, in which at least one substance selected from the group consisting of pigments, thickeners and light stabilizers is present as component d.

8. A process as claimed in claim 1, in which components a and b are used in an equivalent ratio of from 80:20 to 20:80.

9. A process as claimed in claim 8, in which component a is a bisiminoether.

10. A process as claimed in claim 8, in which component a is an iminoether obtainable from reacting a polyisocyanate and a hydroxyl-functional cyclic monoiminoether.

11. A process as claimed in claim 8, in which component b contains an oxazine or oxazoline that is substituted in the 2-position with a phenyl group or an alkyl group that has from 7 to 17 carbon atoms.

12. A process as claimed in claim 8, in which an ester of trifluoromethanesulfonic acid or of a toluene sulfonic acid is used as the catalyst (c).

13. A process as claimed in claim 8, in which at least one substance selected from the group consisting of pigments, thickeners and light stabilizers is present as component d.

14. A process as claimed in claim 1, in which component a is a bisiminoether.

15. A process as claimed in claim 1, in which component a is an iminoether obtainable from reacting a polyisocyanate and a hydroxyl-functional cyclic monoiminoether.

16. A process as claimed in claim 1, in which component b contains an oxazine or oxazoline that is substituted in the 2-position with a phenyl group or an alkyl group that has from 7 to 17 carbon atoms.

17. A process as claimed in claim 1, in which an ester of trifluoromethanesulfonic acid or of a toluene sulfonic acid is used as the catalyst (c).

18. A process as claimed in claim 1, in which at least one substance selected from the group consisting of pigments, thickeners and light stabilizers is present as component d.

* * * * *